United States Patent [19]

Patzschke et al.

[11] Patent Number: 5,066,689
[45] Date of Patent: Nov. 19, 1991

[54] AQUEOUS COATING MATERIAL METHOD FOR ITS PREPARATION AND ITS USE FOR ELECTROPHORETIC COATING

[75] Inventors: Hans-Peter Patzschke; Armin Goebel, both of Wuppertal, Fed. Rep. of Germany

[73] Assignee: Herberts GmbH, Wuppertal, Fed. Rep. of Germany

[21] Appl. No.: 574,544

[22] Filed: Aug. 28, 1990

Related U.S. Application Data

[63] Continuation of Ser. No. 180,482, Apr. 12, 1988, abandoned.

[30] Foreign Application Priority Data

Apr. 15, 1987 [DE] Fed. Rep. of Germany ....... 3712805

[51] Int. Cl.$^5$ .................. C08L 63/00; C09D 5/44; C25D 13/00
[52] U.S. Cl. .................. 523/415; 523/417; 523/420
[58] Field of Search .................. 523/415, 417, 420

[56] References Cited

U.S. PATENT DOCUMENTS 4,752,631 6/1988 Schupp ..................... 523/415
4,762,903 8/1988 Geist ..................... 523/415
4,777,225 10/1988 Paar ..................... 523/415
4,789,696 12/1988 Paar ..................... 523/415

FOREIGN PATENT DOCUMENTS 0004090 10/1981 European Pat. Off. .
0189727 11/1985 European Pat. Off. .
0189729 8/1986 European Pat. Off. .
0137459 4/1987 European Pat. Off. .

Primary Examiner—Paul R. Michl
Assistant Examiner—Christopher P. Rogers
Attorney, Agent, or Firm—Schweitzer Cornman & Gross

[57] ABSTRACT

The invention relates to an aqueous coating agent which contains an organic synthetic resin binding agent which can be made dilutable with water by protonization with acids, containing crosslinking agents and a synthetic resin component containing organic amino groups and hydroxyl groups, and, in some cases, crosslinking catalysts and, if desired, pigments, fillers, corrosion inhibitors or anticorrosives, conventional lacquer adjuvants, and, in some cases, organic solvents in an amount up to 10% of the total weight of the coating agent.

9 Claims, No Drawings

AQUEOUS COATING MATERIAL METHOD FOR ITS PREPARATION AND ITS USE FOR ELECTROPHORETIC COATING

This is a continuing application of U.S. Ser. No. 180,482, filed on Apr. 12, 1988, now abandoned.

BACKGROUND OF INVENTION

The preparation of coatings by depositing film-forming materials on electrically conductive substrates under the influence of an applied voltage is known and is finding ever increasing acceptance in technology for reasons of quality and rationalization. The water-thinning lacquers used in that application are called electrophoresis lacquers or EC lacquers. They are characterized by a good grip and very good protection against corrosion in thin coats, and are prepared in practice from epoxy resins on a basis of bisphenol A and amines and/or amino alcohols. Water solubility is achieved at least in part by forming salts on tertiary amino groups. Thus a basic group is preserved in the baked-on film, which can lead to quality degradation on exposure to a sufficiently great humidity.

Thus, in DE-A-33 36 749=EP 137 459, an amino epoxide resin free of epoxide groups and containing urea groups is prepared by increasing the chain length of an amino epoxide resin containing epoxy groups with an amide or urea derivative containing two amino groups and combining it with crosslinking agents capable of transesterification. The tendencies toward improvement of second-coat adhesion and stone impact strength, which are then recognizable, are not, however, sufficient to satisfy today's more severe requirements. The tertiary amino groups contained in the resin system require a pH of 5 to 6 for solubility.

Synthetic resins having reactive amino groups can be prepared from resins bearing epoxide groups generally by two methods, namely by reaction with polyaminoketimines or with polyamines in excess.

In DE-A-22 52 536 and DE-A-22 65 195 amino epoxide resins are described which are formed by the reaction of epoxide resins with polyamides, which in addition to at least one secondary amino group-, contain primary amino groups latently protected by ketimine groups. For the thermal crosslinking of the films the resins are either mixed with blocked polyisocyanates or are reacted with partially blocked polyisocyanates to a self-crosslinking binding agent. On the basis of this method of preparation, at least one tertiary amino group per molecule is present after the lacquer is baked on, which can negatively affect the properties of the film. To prevent undesirable secondary reactions it is necessary to set out from freshly prepared ketimine, and it is essential to maintain anhydrous conditions of reaction.

In DE-A-31 09 282, isocyanate-reactive functional groups of an epoxide resin (component A) are linked through a diisocyanate (component C) with a mainly aliphatic polyamino compound (component B) whose primary amino groups have been converted to ketimino groups to form a resin of type A-C-B. At the same time numerous byproducts are formed, which have different properties and therefore interfere with uniform eledtrophoretic coating.

In DE 33 25 061 and DE 35 19 935, epoxide resins are reacted with primary diamines whose amino groups are protected by ketimine groups. Chain lengthening through the secondary amino groups is not described. The products that form are not uniform.

In EP-4090 resins containing amino groups are prepared which, at an amine number of 30–150, contain at least ⅓ primary and/or secondary amino groups and are reacted with crosslinking agents which contain reactive ester groups. The resins are prepared by the reaction of epoxide resins with an epoxide equivalent weight of 500 to 2,000 with excess polyamine, which is distilled out. On account of the high viscosity of the resin, severe frothing problems occur in the distillation, making impossible any complete removal of the unreacted polyamines.

In DE-A-27 37 375 is described the reaction of epoxide resins with an epoxide equivalent weight of 400 to 4,000 with excess polyamines which contain at least two amine nitrogen atoms and at least three amine hydrogen atoms per molecule, and the unreacted polyamine is distilled out. To control the amine number and elasticity the molecule is modified with monocarboxylic acid or monoepoxides. The crosslinking is performed with formaldehyde condensation resins.

In EP-189 727 and EP-189 729 the epoxy resin is additionally modified with polyalcohols and crosslinked with blocked polyisocyanates. By this method dark yellow to brown colored plastics are obtained, which still contain 3,000 to 20,000 ppm of unreacted polyamine. Films are obtained which provide a protection against corrosion which no longer satisfies the increasingly severe requirements.

In U.S. Pat. No. 3,963,663 an aminoepoxide resin containing urethane groups and prepared preferentially with primary diamines on a polypropylene glycol basis (=Jeffamin 400) is crosslinked with phenolic resins. The urethane groups are introduced by the reaction of diisocyanates with hydroxy groups of epoxide resins of higher molecular weight. According to the Example, a useful product is obtained only with diamines of high molecular weight containing ether groups, because any excess amine that might possibly have to be distilled out cannot be completely removed on account of the high resin viscosities, and the lacquer qualities are impaired.

The demands of the market are now calling for lower solvent content and lower bake-on temperatures without loss of the grip and corrosion protection properties. Special value is today laid on increased stone impact strength and better properties of adhesion between coats.

SUMMARY OF INVENTION

The invention is addressed to the task of finding cathodically depositable, aqueous electroimmersion lacquer coating agents which will satisfy the above requirements and offer improvements over the known coating agents in regard to the disadvantages described.

It has now surprisingly been found that this task can be achieved by coating agents whose preparation involves substituted aminoepoxide resins of low molecular weight having primary amino groups, from which the excess polyamine can easily be distilled, and which then are reacted in an appropriate manner with diisocyanates and mixed with crosslinking agents, especially blocked polyisocyanates. After the ground coats obtained by electrophoretic deposition have been baked on, these coating agents produce films of particularly good properties. An additional advantage is the possibility of depositing them uniformly by electrophoresis without resulting in concentrations of undesired resin components in the electrophoresis bath.

DETAILED DESCRIPTION OF INVENTION

The preparation of the amino epoxide resin (component A) containing urea groups which can be diluted with water after protonization with acids and contain mostly primary amino groups is performed by setting out from:

A-I 90 to 40 wt. % epoxide resin/polyamine adducts modified with unsaponifiable or poorly saponifiable alkyl or alkylaryl moieties having at least one primary and at least one secondary amino group per molecule, whose primary amino groups are reacted first in a solvent containing carbonyl groups, preferably ketone groups, with azeotropic removal of water from the circuit, at temperatures of 30° to 200° C., preferably 50° to 120° C., to the corresponding aldimine or ketimine groups, and then with A-II 10 to 60 wt. % polyisocyanates or prepolymers containing isocyanate groups, while a molecule enlargement takes place mainly through the secondary amino groups, followed by hydrolysis of the aldimine or ketimine groups.

Preferably, 85 to 50 wt. % of component A-I is reacted with 15 to 50 wt. % of component A-II. Diisocyanates are preferred as component A-II. It is desirable to react approximately x mol of diisocyanate with (x+1) mol of amino epoxide resin (component A-I), x being from 1 to 6, preferably 1 to 2. The object of the preferred reaction of the isocyanate groups with the secondary amino group with the formation of urea is a molecular enlargement. On the basis of this reaction, the content of low-molecular-weight amines is simultaneously diminished and the performance of the electrophoretic deposition is improved. Departures from the ideal molar ratios can serve to control the amine number and viscosity. If less diisocyanate is put in, a product of lower viscosity is obtained with a higher amine number. If the amount of diisocyanate is increased, the molecular mass increases by the reaction of additional isocyanate groups with the hydroxyl groups of component A-I; the upper limit of the amount of isocyanate to be added is best selected such that the danger of gelling is prevented. A similar effect is also achieved by replacing a percentage of the diisocyanate with triisocyanate.

The amino epoxide resin (component A) contains at least one primary amino group and at least one urea group per molecule and has an amine number of 30 to 170, preferably 40 to 100 (mg KOH per g solid resin) corresponding to 0.5 to 3.0, preferably 0.7 to 1.8 milliequivalents of cationic groups per gram of solid resin and an average molecular mass of 700 to 10,000, preferably 950 to 4,000. If the amine number is too low, the solubility is too slight, or excessively acid pH concentrations develop in the deposition baths due to an excessively high degree of neutralization.

If the amine number is too high, the deposited film adheres poorly or an uneven surface of varying coat thickness forms.

It is not only the number of the secondary and primary amino groups that affects the crosslinking reactions of the amino epoxide resin (component A) which take place later on, but also the hydroxyl groups present in the molecule. Thus, the amino epoxide resin containing the urea groups should contain 2 to 6, preferably about 4 hydroxyl groups in the molecule. This corresponds to a hydroxyl number of 35 to 250, preferably 100 to 180, or 0.6 to 4.5, preferably 1.8 to 3.2 milliequivalents of hydroxyl groups per gram of solid resin. If the amine and hydroxyl number is too low, films develop in the crosslinking which are still soluble or swellable in organic solvents such as acetone or methylethylketone. If the amine and hydroxyl number, however, is too high, the film becomes too brittle and often too hydrophilic. At least two amino or hydroxyl groups capable of crosslinking must be present in the molecule.

In the reaction of component A-I with A-II if a stepwise procedure is used, the gelling tendency is reduced and especially soluble products are obtained. Preferably:

1. First about 0.8 to 1.2, preferably 0.9 to 1.1 mol of water per primary amino group is distilled out of component A-I with solvents containing carbonyl groups, especially keto groups, at temperatures of 30° to 160° C., preferably 50° to 110° C., and 2. then the imine obtained, e.g., the ketimine of the substituted epoxy resin/polyamine adduct, is reacted with polyisocyanates, with the exclusion of water, at temperatures under 100° C., preferably from 55° to 70° C. The solvents containing carbonyl groups used in the preceding step are reused as solvent, so that isolation of the imine is not necessary. A reaction of the capped primary amines with the isocyanate group is thus largely prevented. Furthermore, no substances such as water which undermine the ketimine formation are to be present during the reaction. The reaction itself is not so critical because, in contrast to the state of the art, no compounds of low molecular weight form in the hydrolysis.

Solvents containing carbonyl groups are ketones and aldehydes with a molecular mass of 58 to 150, ketones being preferred on account of their more pleasant odor. Suitable ketones are those whose organic moieties are inert with respect to the ketimine bonds, which remove the reaction water azeotropically from the circuit, and whose substituents produce as little steric hindrance as possible. Suitable ketones are methylethylketone, diethylketone, ethyl-n-propylketone, methylisobutylketone, dibutylketone, cyclopentanone, cyclohexanone, isophorone or acetophenone. In general, methylisobutylketone is preferred. The reaction conditions (reaction temperature, ketone excess, selection of solvent, acid or basic catalyst) are best selected such that as many primary amino groups as possible are converted to an aldimine or ketimine without additional aldol condensation. The ratio of primary amino groups to aldehydes or ketones amounts to 1:1.1 to 1:5, preferably 1:1.3 to 1:3, and can be catalyzed if desired by acids or salts of acids. For the better separation of the water, aliphatic or aromatic hydrocarbons can be added to the solution or to the separator. The chemical structure of the amino epoxide resin (component A) containing urea groups and its properties can be varied to a great extent, for example:

by selecting the monofunctional modification components and the polyamines, by the number of the amine groups and hydroxyl groups, by the molecular mass and the molar ratio of components A-I and A-II, by the different functionality of the compounds bearing the epoxide groups and the isocyanate groups, by the ratio of hard and soft molecule segments.

Furthermore, a modification or influencing of the properties of the coatings obtained can be achieved by the crosslinking agent (component B) that is later to be used for component A.

The epoxide resin/polyamine adduct (component A-I) can generally be represented in simplified form by the following formula:

$$H_2N-R'-NH-R^{11}(X-R)_m \qquad (1)$$

wherein R' represents the hydrocarbon moiety, substituted if desired by secondary amino groups, of a polyamine, $R^{11}$ represents the moiety of a polyepoxide resin, and R represents a monofunctional alkyl or alkylaryl moiety which is bound by a non-saponifiable or poorly saponifiable group X to the epoxy group-containing resin $R^{11}$, and m=1 to 3, preferably 1. The preparation of this epoxy resin/amine adduct is performed first by defunctionalizing the resin containing epoxide groups with the modification component R—X—H and then reacting the remaining epoxide groups with excess polyamines.

Resins containing epoxide groups having preferably terminal 1,2-epoxide groups are polyglycidyl ether, polyglycidyl amines or epoxide-group-containing polyhydrocarbons which can best contain no hydroxyl groups, with an average molecular mass of 140–1,000 and an epoxide equivalent weight of about 70 to 500. 1.5 to 8, preferably 1.8 to 3 epoxide groups per molecule can be present. Suitable polyepoxide resins are, for example, compounds of the idealized formula:

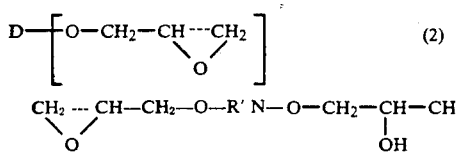

in which

D represents a polyvalent, preferably bivalent alcohol, phenol, amine or corresponding heterocyclic compounds, and n is a number from 2 to 6, preferably 2, and which also can be used in the form of mixtures.

Polyglycidylethers which contain about two 1,2-epoxide groups per molecule, with an average molecular mass of about 300 to 500 and an epoxide equivalent weight of about 170 to 300, especially 180 to 250, are especially preferred. These are preferably liquid products. They are prepared for example by the reaction of epihalogenhydrius or methyl epihalogenhydrins, preferably epichlorhydrin with bivalent phenols, and by selecting the molar ratios and by adding appropriate basic catalysts, such as ammonium or phosphonium salts, the molecular mass can be adjusted. For example, Formula 2 includes resins of the following formula:

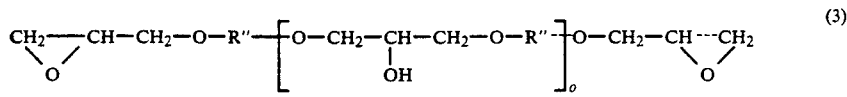

wherein o=0 to 2 and R" is preferably the moiety of a bisphenol of the following structure:

wherein Y=—CH$_2$—, —C(CH$_3$)$_2$—, —CO—, —S—, —SO—, —SO$_2$—, —C(CCl$_3$)$_2$. The aromatic rings can be substituted, if desired, by halogen or alkyl groups.

Typical bivalent phenols are hydroquinone, resorcinol, 1,5-dihydroxynaphthaline, p,p'-dihydroxydiphenylpropane, p,p'-dihydroxybenzophenone, p,p'-dihydroxydi-tertiarybutylphenylpropane or bis(2-hydroxynaphthyl)methane.

Preferred are technical mixtures, such as mixtures of dihydroxydiphenylpropanes, especially the 4,4'-isomers with small percentages of 2,2'- or 4,2'-isomers. The described epoxide resins can also be completely or partially hydrated, such as for example 1,4'-bis(-2,3'-epoxypropoxy)cyclohexane or can be used in mixtures of different structure and molecular mass.

These described polyepoxide resins can, if desired, be replaced proportionally by more elastic modifications. They form on the basis of bivalent phenols, especially bisphenol, by the reaction of the polyepoxide resins with polyalcohols, preferably long-chain dialkanols HO-E-OH, such as 1,4-butanediol or 1,6-hexanediol in the presence of suitable catalysts, with the formation of:

or by reaction of polyvalent phenols with alkylene oxides such as ethylene oxide, propylene oxide, butylene oxide, stearyl oxide, and then reaction with epichlorhydrin with the formation of

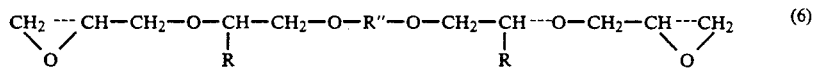

wherein R=hydrogen or a low alkyl moiety, preferably —CH$_3$, and R" is as defined above.

Also suitable are polyglycidyl ethers of polyvalent alcohols, which are characterized by the following formula and are included by the above general formula 2:

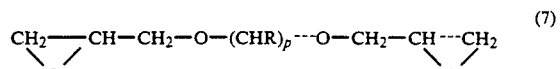

wherein R=hydrogen or a low alkyl moiety provided, if desired, with various substituents, preferably —CH$_3$ and p=2 to 15. Typical examples of this are the reaction products of epichlorhydrin and ethyleneglycol, 1,3-propyleneglycol, 1,4-butanediol, 1,5-pentanediol and 2-ethylhexanediol-1,6, but also compounds such as 1,2,6-hexanetriol or bis-(4-hydroxycyclohexyl)-2,2-propane. Suitable polyglycidyl esters, however, can also correspond to the formula

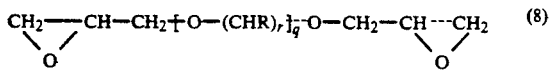 (8)

which likewise comes under the general formula 2, R having the same meaning as above, and 5 being 2 to 6 and q being 1 to 20. Typical examples are the reaction products of epichlorhydrin and ethyleneglycol, 1,2-propyleneglycol or 1,2-butyleneglycol and the polyethers obtained therefrom, such as polyethyleneglycols, polypropyleneglycols or polybutyleneglycols with different molecular masses.

Also under formula 2 come heterocyclic polyepoxide compounds which can also be used, such as 1,3-diglycidyl-5,5-dimethyldantoin or triglycidylisocyanurate. Another suitable class of polyepoxides is polyglycidylethers of phenolic novolak resins. They are condensed under acid conditions by the action of formaldehyde on phenols in the molar ratio of 1:0.5 to 0.8 and then reacted with epichlorhydrin. They have an epoxide equivalent weight of 150 to 300, preferably 170 to 210, and contain about 2 to 4 glycidyl groups per molecule. In this resin system it is to be considered that it generally has a higher average molecular mass, for example between 474 and 3000.

Polyglycidylethers of polyamines such as N,N-diglycidylaniline or N,N,N',N'-tetraglycidyl-4,4'-diaminodiphenylmethane or epoxidized aminomethyldiphenyloxides can also be used as polyepoxides. For the process of the invention polyglycidyl ethers are preferred with contain no additional amino groups.

Epoxide resins are also understood to include aliphatic or cycloaliphatic hydrocarbons which are free of ester groups and contain epoxy groups, and which are prepared by epoxidization with per acids. Examples are epoxidized polybutadiene oils, vinylcyclohexene dioxide or bis-(2,3-epoxycyclopentyl)ether.

For the defunctionalization the polyepoxide resins the latter are reacted in a first reaction step with monofunctional alkyl or alkylaryl compounds R—X—H whose hydrogen-reactive groups react with oxyran groups with the formation of an unsaponifiable or poorly saponifiable compound —X—. It is, for example, an —O—, —S—, —NR— (R being defined as given below for the formula R—X—H ), —CONH— or —COO— group. With the group R, a terminal, elastifying aliphatic hydrocarbon radical is introduced into the molecule, through an aromatic ring in some cases. It can be linear, branched or cyclic, saturated or unsaturated, it can additionally contain ether groups in the chain or in the ring, and consists of 2 to 20, preferably 4 to 18 carbon atoms. It can be substituted by hydroxyl or alkoxy groups with 1 to 4 carbon atoms. If R is an alkylaryl moiety, the aryl group contained therein is a benzene or naphthaline moiety, substituted in each case with 1 to 3 of the alkyl moieties cited above for R.

In order to avoid molecule splitting in the polyamine reaction, the modifying epoxy resin may not contain any easily hydrolyzable groups. If ester or amide groups form in the reaction, therefore, the modifying compound must be selected such that it becomes difficult to saponify due to its chemical structure, e.g., due to steric hindrance. Typical examples of suitable monofunctional modifying agents are secondary dialkylamines, such as di-n-butylamine or N-methyl-N-dodecylamine, secondary amino alcohols such as diethanolamine or N-methyl-N-dodecylamine, secondary amino alcohols such as diethanolamine or N-methylethylhexyl-amine, but also cyclic amines such as morpholine or oxazolidine. Furthermore, alkyl mercaptans find application, such as laurylmercaptan or tertiary-butylthio-cresol, monocarboxylic acids such as tertiary-butylbenzoic acid, cyclohexanemonocarboxylic acid, or better alpha-substituted alkylcarboxylic acids such as versatic acid or dimethylolpropionic acid, carboxylic acid amides such as coconut fatty acid amide or monoalcohols such as dodecyl alcohol, furfurol, or benzyl alcohol. The use of secondary amines or amino alcohols leads to tertiary amino groups whose use is to be largely avoided.

Especially good properties are obtained with monophenols which are substituted with one or more saturated or unsaturated, linear, branched or cyclic alkyl moieties with 1 to 20 carbon atoms, especially 4 to 16 carbon atoms. Longer-chained alkyl moieties are preferred in order to achieve a certain elastificiation. Examples of these are: tertiarybutylphenyl, n-octylphenol, 2-ethyl-hexylphenol, n-dodecylphenol, 2,6-xylenol, 2-methyl-4-tertiarybutylphenol, 2,4,6-trimethylphenol or cardanol, which consists essentially of 3-(8, 11)-pentadecadienylphenol.

The oxyran groups present in the epoxide resin are reacted as completely as possible by heating with the monofunctional modifying component at 50° to 200° C., possibly with the addition of 0.01 to 3 wt. % of catalysts such as triphenylphosphine, benzyltrimethylammoniumhydroxide or suitable phosphonium compounds. To control the reaction, appropriate nonreactive solvents can be added, such as aromatic hydrocarbons, alcohols, ketones, ethyleneglycol or propylenegly- colmono- or diethers. The quantity ratios are selected such that, in the case of 100% transformation, 0.5 to 1.2, preferably 0.8 to 1.1 oxyran groups per molecule remain free. Preferably one oxyran group per molecule is made available for the further reaction with polyamines. If the number of the oxyran groups is greater than 1, the amine number is increased. If it is less than 1, the molecules are ones that no longer contain amino groups. Then, in the reaction with diisocyanates or in the crosslinking with blocked polyisocyanates, such molecules can be installed in the molecule with the formation of urethane. The secondary hydroxyl groups that are formed by the reaction can be reacted partially or completely by transesterification with fatty acid methyl esters or with alkyl or aryl monoisocyanates of different chain length. For example, lauric acid methyl ester, oleic acid methyl ester, linoleic acid methyl ester, n-butylisocyanate, stearylisocyanate, cyclohexylisocyanate or phenylisocyanate are used for this purpose.

In a second reaction step the modified epoxide resin is reacted in homogeneous phase, at a solid content of 20 to 100 wt. %, with excess polyamine having at least two primary amino groups, which contains no functional groups other than secondary amino groups if present, which can react with oxyran groups. The reaction of the amines begins at room temperature and is generally exothermic. It must be ascertained for reasons of stability, by increasing the reaction temperature to about 50° to 150° C., preferably 60° to 85° C., that after the reaction has ended no more epoxide groups are present. The more aminohydrogen bonds the polyamine contains, and the lower the resin concentration is, the lower can be the polyamine excess. With increasing dilution, resins of lower molecular mass are obtained. A reaction of one mol of polyamine per epoxide group is the object. The content of primary and secondary amino groups in component A, with respect to the total basic nitrogen atoms, should be as high as possible. It is more than 50%, preferably more than 67%, and especially preferably more than 90% of the total amount of amine nitrogen. The conduct of the reaction with the polyamine must be such that the tertiary amine content that is formed will be less than 10%, preferably less than 1.0%, of the total nitrogen content. This is determined substantially by the amount of the excess amine, and 1.1 to 10 mol, preferably 1.2 to 5 mol, and especially preferably 1.5 to 3 mol of the polyamine is put in per epoxide equivalent of the resin. To reduce the needed amine excess it is recommended that the liquid epoxide resin be added to the amine. Suitable polyamines contain per molecule at least two amine nitrogen atoms and at least two carbon atoms between the amino groups, as well as preferably two primary amino groups together with at least four amine hydrogen atoms. The carbon chain of the amines can be interrupted by ether groups. The molecular mass is preferably about 60 to 300. Examples of suitable polyamines are primary alkylene diamines with at least two carbon atoms, such as ethylenediamine, the various isomers of diaminopropane, -butane, -pentane and -hexane, 2-methylpentanediamine, trimethylhexamethylenediamine, isophoronediamine or 1,4-diaminocyclohexane, as well as other alkylene polyamines such as diethylenetriamine, triethylenetetramine or dipropylenetriamine, those polyamines being preferred which contain only two primary amino groups. Especially suitable are those polyamines which easily dissolve the foreproduct carrying the epoxide groups and can, on the basis of their low boiling point, be especially easily distilled out again.

To prevent discoloration or degradation phenomena, the polyamine reaction and the distillation should be performed with the exclusion of oxygen and at temperatures under 150° C., preferably under 100° C., in a vacuum in some cases.

If the carbon chain of the polyamine is too long, the solubility of the resin in water is limited. Diamines are used which have a molecular mass under 150, preferably under 100, and a boiling point below 250° C., preferably under 150° C., at standard pressure. Amine moieties can also be removed easily by thin-film distillation or steam distillation performed so that the content of free, unreacted polyamines is reduced insofar as possible.

According to the process described in DE 35 38 548, the unreacted polyamine is removed by circuit distillation in the presence of a suitable resin solvent with the addition of water, in some cases under reduced pressure. The reaction mixture is obtained at least 5° C., preferably 10° C., above the boiling temperature of the water/solvent azeotrope so that the water is immediately withdrawn from the reaction mixture. To achieve a high water throughput a very large amount of heat is put in and the amount of water is adjusted thereto. The water consumption depends on the difference in boiling point between the polyamine and the solvent. For example, the amount of water used for the removal of residual ethylenediamine is reduced if instead of xylene the higher-boiling cumene is used as the withdrawing agent. The distillation with water is continued until 100 g of the solvent, distilled until free of water, consumes less than 10 ml, preferably less than 2 ml, of 0.1 N methanolic hydrochloric acid. The products obtained in this manner have no amine odor and are virtually free of monomeric polyamine residues, i.e., the content of monomeric polyamines is less than 50 ppm, preferably less than 10 ppm. The solvent is added either before or after the reaction with the polyamine. Solvents which uniformly dissolve the resin and are suitable as withdrawing agent, boil under atmospheric pressure at 110° to 270° C., preferably at 115° to 200° C., and are generally not completely miscible with water. Typical examples are aliphatic and aromatic hydrocarbons, preferably alkyl-substituted benzols in the boiling range of 140° to 180° C., such as benzene, toluene, xylene, ethylbenzene, cumene or tetraline, as well as symmetrical or asymmetrical ethers with 6 to 12 carbon atoms, such as dibutylether, anisol, diphenylether, preferably alcohols with 4 to 8 carbon atoms, such as butanols, pentanols, hexanols or ether alcohols such as n-butoxy-propanol. On the basis of the low viscosity of the modified polyamine/epoxy resin adduct the organic solvents can be distilled out virtually entirely. Both in the case of the polyamines and the solvents, mixtures can be used. However, the use of only one solvent and one polyamine is preferred, whose boiling points are to be relatively far apart, in order to be easily recycled.

For the reaction with the epoxide resin/polyamine adducts (component A-I), polyisocyanates or corresponding prepolymers containing isocyanate groups are used as component A-II. The organic polyisocyanates have an average molecular mass of 112 to 5,000, preferably 140 to 1,000, and can best have an average isocyanate functionality of 2 to 8. Suitable polyisocyanates are, for example, compounds of the idealized formula

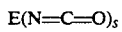  (9)

wherein

E represents an aromatic hydrocarbon moiety substituted, if desired, with one or more alkyl groups, or having methylene bridges, and having a total of 6 to 15 carbon atoms, an aliphatic hydrocarbon moiety of 2 to 18, preferably 6 to 10 carbon atoms, a cyclic hydrocarbon moiety with 6 to 15 carbon atoms or a heterocyclic ring, and s represents a number of 2 to 4, preferably 2 to 3.

Typical examples of such polyisocyanates are propylenediisocyanate, ethylethylenediisocyanate, dimethylethylenediisocyanate, trimethylenediisocyanate, tetramethylenediisocyanate, pentamethylenediisocyanate, hexamethylenediisocyanate, trimethylhexanediisocyanate, 1,12-dodecanediisocyanate, 1,18-octadecanediisocyanate, cyclopentanediisocyanate, cyclohexane-1,3- and -1,4-diisocyanate, as well as any mixtures of these isomers, methylcyclohexanediisocyanate, m- or p-tetramethylxylenediisocyanate, 1-isocyanato-3,3,5-trimethyl-5-isocyanatomethylcyclohexane, perhydro-2,4'- and/or -4,4'-diphenylmethanediisocyanate, 1,3- and 1,4-phenylenediisocyanate, 2,4- and 2,6-toluylenediisocyanate as well as any mixtures of these isomers, xylylenediisocyanate, diphenylmethane-2,4'- and/or -4,4'-diisocyanate, 3,2'- and/or 3,4'-diisocyanato-4-methyldiphenylmethane, bisphenylenediisocyanate, naphthylene-1,5-diisocyanafe, triphenylmethane-4,4',4''-triisocyanate, 2,2',4,4'-tetraisocyanato-5,5'-dimethyltriphenylmethane, diphenyltetraisocyanate or naphthyltetraisocyanate. Mixed aliphatic and aromatic compounds are also suitable. Especially preferred are diisocyanates produced on a large technical scale, such as toluylenediisocyanate, hexanediisocyanate, isophoronediisocyanate or dicyclohexylmethanediisocyanate.

In addition to the low molecular-weight polyisocyanates given by way of example, the higher molecular-weight isocyanate polymers known in polyurethane chemistry, based on urethane-group-free polyisocyanates and higher molecular-weight polyhydroxy compounds can be used as polyisocyanate components. It is desirable to react (n+1) mol of the above-described diisocyanates with N mol of a difunctional compound reactive to isocyanate, at temperatures of preferably 50° to 120° C., in the fused state or in the presence of inert solvents which can be either low molecular-weight or high molecular-weight solvents with a molecular mass of 62 to 5,000, preferably 90 to 1,000. If an excess of diisocyanate is used, the excess isocyanate has to be removed again by distillation. Low-molecular-weight dialcohols are to be understood to be the various isomers of linear, branched and cyclic carbon compounds with 2 to 20 carbon atoms and two secondary and/or primary hydroxyl groups. Typical examples thereof are 1,4-butanediol, 1,6-hexanediol, trimethylhexanediol, bis(hydroxymethyl)cyclohexane, neopentyl glycol, hydroxypivalic acid neopentylglycol ester, N-methyldiethanolamine or bis-ethoxylated bisphenol A. Suitable higher molecular-weight polyhydroxyl compounds are the polyester diols, polycaprolactone diols, polycaprolactam diols, polyglycol ether diols known in polyurethane chemistry. Also usable are long-chain primary and secondary diamines, such as 1,6-hexanediamine, adducts of 2 mol of glycidylether or glycidylester onto hexanediamine, N,N'-cyanethylethylenediamine or bis-N,N'-cyanethylpolyoxypropylenediamine.

Diisocyanates are preferred for the reaction according to the invention. However, higher polyisocyanates, as later mentioned in the description of the crosslinking agent, can also be used if they are defunctionalized by suitable monofunctional compounds to a diisocyanate. Monoalcohols or monoamines of different chain length, such as n-butanol, isodecanol or diethylhexylamine can serve for this purpose, or also the compounds later described as capping agents. Depending on the nature of the group and the baking conditions the introduced organic moieties remain preserved as elasticizing agents, or lead to a self-crosslinking binding agent by splitting off the protective group.

The reaction of the modified epoxy resin/polyamine adducts with the polyisocyanates is performed, as already stated, in solvents or solvent mixtures containing carbonyl groups, such as ketones or solvents containing ketones. These are directly distilled out at the end of the reaction, sometimes after the addition of component B, and they are diluted with appropriate solvents.

The aldimine or ketimine groups are split off upon the addition of water. This can take place before or after the addition of component B. In the hydrolysis before addition of component B it may be desirable to make the amount of water equivalent, and to neutralize component A partially or completely. The hydrolysis of the ketimine groups can be performed automatically after addition of component B in the preparation of the dispersion.

For use, 40 to 95 weight-percent, for example, of the above described aminoepoxide resins containing urea groups (component A) is mixed with, for example, 5 to 60 weight-percent of crosslinking agent containing no carboxyl groups (component B) and can be used according to the invention, e.g., in binding agents for cataphoretic depositing in ET baths (KTL baths). Mixtures of 50 to 80 wt. % component A with 20 to 50 wt. % component B are preferred.

In order to achieve certain technical application properties, component A can be replaced with up to 50% of resins containing other hydroxyl and tertiary amino groups. For example, aminoepoxide resins obtained from epoxide resin on the basis of bisphenol A, dialkylaminoalkylamine, dialkanolamine and adducts of 1 mol alkanediamine and 2 mol glycidylester or glycidylether can serve for this purpose. These resins are used preferably in amounts under 30 wt. %. Aminoacrylate resins prepared, for example, from dialkylaminoalkyl(meth)acrylate, hydroxyalkyl(meth)acrylate, vinyl aromatic compounds, and various (meth)acrylic acid esters are used preferably in amounts under 15 wt. %.

Conventional crosslinking agents reactive with amino- and/or hydroxyl functions, as described in the literature for such purposes, serve as crosslinking agents (component B). Examples are: formaldehyde condensation resins (urea resins, melamine resins, benzoguanine resins or phenolformaldehyde resins), blocked polyisocyanates, resins having transesterifiable ester groups, or mixtures thereof. The ratio of admixture is determined empirically according to the optimum achievable technical application properties at the given baking temperature. A combination of several crosslinking systems can be advantageous in certain cases. The formaldehyde condensation resins contain acid catalysts, which are best blocked to accelerate the reaction, and which are chemically built into the crosslinking agent or the basic resin, as for example by reaction with aminosulfonic acid, or only admixed, such as the morpholine salt of p-dodecylbenzenesulfonic acid. Components A and B can be mixed cold or also precondensed at elevated temperatures. The components A and B react to a certain extent with one another, though the mixture does not lose its heat-hardening ability and the property of being able to be made water-soluble by protonization with acids. Precondensations are best performed at about 80° to 150° C. with carboxyl-group-free formaldehyde condensation resins until the original mixture viscosity has increased by 10 to 70%. Completely blocked polyisocyanates, containing in some cases conventional catalysts, are used preferentially as component B. For special purposes it can be desirable to blend the blocked polyisocyanates with up to 5%, preferably less than 3%, of transesterifiable polyesters.

The polyisocyanates and/or the prepolymers containing isocyanate groups used as crosslinking agents are the same as were described above for the component A-II. They differ, however, in that they make available for the crosslinking an average of preferably more than two reactive isocyanate groups per molecule, which are blocked by protective groups. For example, mixtures of trivalent polyisocyanates or of those of higher valence with difunctional prepolymers containing isocyanate groups can be used.

The equivalent ratio of primary or secondary amino groups and hydroxyl groups of component A to the blocked isocyanate groups of component B is in the range of 1:0.1 to 1.5, preferably 1:0.7 to 1.2, and amounts with special preference to 1:1.

Polyisocyanates are capped or blocked when they do not react at normal storage temperatures with the active hydrogen atoms of the base resin (hydroxyl groups or amine hydrogen groups). If the coated object, however, is heated to a temperature that is sufficient to uncap the isocyanate, the crosslinking or hardening of the coating to a protective, insoluble film takes place. Any desired isocyanates can be used as capped isocyanates in which the isocyanate groups have reacted with a compound which reacts with active hydrogen at elevated temperature, as a rule between about 90° and 200° C. Blocked polyiscyanates are prepared, for example, by reacting a multifunctional isocyanate with at least a stoichiometric amount of a monofunctional compound containing active hydrogen (Zerewitinoff reaction), preferably at temperatures of 50° to 80° C., and if desired conventional catalysts, such as tertiary amines or small amounts of tin salts, such as dibutyltindilaurate, can be added. The isocyanate group is in this manner protected at room temperature against reactions with water or alcohols. At baking temperatures of less than 210° C., preferably less than 190° C., especially under 180° C., but otherwise over 110° C., preferably above 140° C., and especially preferably above 150° C., it splits off again, so that the released isocyanate group can react with the base resin.

The so-called "lacquer polyisocyanates," which are prepared from known diisocyanates, are especially suitable as the polyisocyanates. Thus, tris-(6-isocyanatohexyl)-biuret forms from hexanediisocyanate and water. By the trimerization of hexanediisocyanate, tris-(6-isocyanatohexyl)-isocyanurate is obtained, mixed in some cases with its higher homologues, as well as additional polyisocyanates having isocyanurate groups made from isophoronediisocyanate, diisocyanatotoluene or mixtures of diisocyanatotoluene and hexamethylenediisocyanate. Polyisocyanates which are very well usable are also the polyisocyanates having urethane groups, which can be obtained by the reaction of excess amounts of 2,4-diisocyanatotoluene with simple, polyvalent alcohols of molecular mass 63 to 300, especially trimethylolpropane and, if necessary, removal by distillation of the unreacted diisocyanate excess. For example, blocked triisocyanates or blocked higher-molecular-mass reaction products of triisocyanates with dialcohols are especially preferred. In this reaction it is recommendable to maintain the following molar ratios:

Triisocyanate:diol:protective group, as 3y:(y-1):(y+2), y being equal to 1 to 6, preferably 2 to 3. Agents which block the isocyanates contain only a single amine, amide, imide, lactam, thio or hydroxyl group. In general, volatile compounds containing active hydrogen and of low molecular masses, preferably of not more than 300, more preferably of not more than 200, are used. For example the following have proven practical:aliphatic or cycloaliphatic alcohols such as n-butanol, 2-ethylhexanol, cyclohexanone, phenols, tertiary-butylphenols, dialkylaminoalcohols with as dimethylaminoethanol, oximes such as methylethylketoxime, lactams such as epsilon-caprolactam or 2-pyrrolidone, imides such as phthalic imide or N-hydroxymaleinimide, hydroxyalkylesters, or malonic acid or acetic acid esters. However, beta-hydroxyglycols or beta-glycolethers and glycolamides are also recommended. Oximes and lactones are of special interest as capping agents, because the polyisocyanates capped with them react at relatively low temperatures.

Particularly advantageous is the use of a blocked polyisocyanate mixture of polyisocyanates of the lowest possible molecular weight having three and more isocyanate groups, and linear reaction products containing isocyanate groups and having an average molecular weight of 500 to 5000, preferably 800 to 2000, obtained from (cyclo)aliphatic dialkanols and/or N-alkyldialkanols and (cyclo)aliphatic diisocyanates, preferably aliphatic C4 to C18 dialkanols, N-methyl- or N-ethyl-dialkanolamine, such as N-methyldiethanolamine or aliphatic diisocyanates such as hexanediisocyanate.

The blocked polyisocyanate (component B) is generally kept stably emulsified in the aqueous dispersion by the neutralized aminoepoxide resin. In the case of relatively great amounts, however, it is useful to install basic nitrogen atoms in the blocked polyisocyanate. This is performed for example by the reaction of the isocyanates with polyalcohols containing tertiary amino groups, such as N-methyl-dietho anolamine, triethanolamine, or polyamides containing tertiary amino groups such as 3-(methyl)-3-(2-aminoethyl)aminopropylamine. While in this case a molecule enlargement occurs, the blocking of the isocyanate group can also be performed with monofunctional compounds having tertiary amino groups. For example N-dialkyl-aminoalcohols, such as dimethyl-aminoethanol, or N,N-dialkyl-alkylenediamines such as dimethylaminopropylamine or N,N-diethyl-N'-methyl-1,3-ethanediamine, serve for this purpose.

It is not necessary to add separate crosslinkers, because the crosslinker function can also be built into the synthetic resin according to the invention and it thus becomes self-crosslinking. This can be performed, for example, by reacting the component A, A-I or a foreproduct thereof, with a partially locked polyisocyanate which still contains on the average about one free isocyanate group in the molecule. The capping agents can be the same as those used for the fully blocked polyisocyanate. Another possibility for making the synthetic resin according to the invention self-crosslinking consists in the reaction of a portion of the primary amino groups with alkylenecarbonates to beta-hydroxyalkylcarbamates, which can be performed in a conventional manner.

The crosslinking of the amino epoxide resins containing urea groups with blocked polyisocyanates can be accelerated if necessary by the addition of 0.01 to 2 wt. %, especially 0.5 to 1 wt. %, with respect to the solid resin, of catalysts, such as highly basic tertiary amines and/or active metal compounds. A special, often synergistic action is achieved by the combination of basic medium of the precipitated resins and the metal salts of bismuth, lead, cobalt, iron, antimony and/or tin(II) and tin(IV) compounds. Especially preferred are catalysts such as iron(III) acetylacetonate, zinc acetylacetonate, dibutyltin dilaurate, di-n-butyltin oxide, dibutyltin dioctyl maleate, tin octoate, tin oleate, tetrabutyltitanate and/or cobalt-2-ethylhexanoate. Preferred are catalysts which are only limitedly soluble and deposit themselves electrophoretically with the lacquer in finely divided form, and can be uniformly distributed in the film when baked on, without leveling problems. If unsaturated double bonds are contained in the resin, the conventional metal dryers can be added in emulsion form, if necessary, to improve the hardening properties.

To balance out the technical application properties it is desirable that the cathodically depositing resin contain, in addition to the crosslinking agent, up to 30 wt. %, preferably 5 to 20 wt. %, to a hydroxy-functional resin. Thus, to increase the grip, hydroxy-functional resins with a hydroxyl number of 30 to 500, especially 50 to 300, and a molecular mass of 300 to 5 000, especially 500 to 3,000, can be used. Examples of such resins are styrene-allyl alcohol copolymers, (meth)acrylic copolymers containing hydroxyl groups, caprolcatone polyols, caprolactam polyols, urethane polyols, and polyethers and polyesters containing hydroxyl groups. The resins contain such an amount of polar groups, preferably primary hydroxyl groups, that they are perfectly emulsified in the neutralized, basic resin mixture (component A). To achieve better compatibility and better dilution with water it is possible to incorporate a low amine number under 30, especially under 20. The molecular mass range is selected such that they are no longer volatile, but due to improved flowing quality good film formation is achieved. Any precondensation that may be performed can be performed in any desired order.

By protonization with acids the cationic binding agent mixed with the crosslinking agent can be rendered dilutable with water in a manner known in itself. Examples of acids are formic acid, lactic acic, acetic acid, propionic acid, citric acid, malonic acid, acrylic acid, phosphoric acid or alkylphosphoric acid. Monobasic organic carboxylic acids of low molecular weight are preferred. At least enough acid must be added to form a stable emulsion of cationic binding agent and crosslinking agent. An excess of acid, i.e., a neutralization in excess of 100%, is best avoided. The MEQ value (milliequivalents of acid per 100 g of solid resin) is generally between 20 and 80. A very low MEQ value is desirable in order to obtain the highest possible separation equivalent.

The preparation of especially low-solvent emulsions can be performed in the following manner: The organic solution of the aminoepoxide resin (component A), mixed if desired with the organic solution of the crosslinking agent (component B), is neutralized by the addition of acids, such as carboxylic acids, for example, as mentioned above, to an MEQ value of 15 to 45 and, after the addition of water, subjected to an azeotropic distillation at the boiling temperature.

For the avoidance of reactions the distillation temperature can be at about 40° to 60° C. in the vacuum. The separator is designed so that the water flows back into the flask and the solvent, methylisobutylketone, for example, is separated. It has to be determined empirically what amounts of neutralizing agent and water have to be employed in order to obtain an easily distilling product with the lowest possible frothing tendency. In this manner, stable, virtually solvent-free aqueous dispersions of binding agents can be prepared. Such a binding agent or coating agent can be treated to improve leveling or to control the coating thickness by adding very small amounts of solvents as coalescing agents. The organic solvent content should be less than 10%, and especially less than 5%. The solvents can be alcohols, glycol ethers, keto alcohols, but also aliphatic and/or aromatic hydrocarbons of various chain length. In selecting them the fact must be considered that the crosslinking agent is not water-soluble and in some cases suitable solvents can facilitate and stabilize the dispersing process. With increasing solvent content the grip becomes poorer, the precipitated coating thickness increases, and over-coating can occur. Solvents insoluble in water have a stronger effect than water-soluble solvents. To improve leveling and lower the coating resistance, a percentage of non-water-soluble, high-boiling solvent can be added, such as hexylene glycol, phenoxyethanol, ethylhexanol, isodecanol, or 2,2,4-trimethylpentanediol-1,3-monoisobutyrate.

For the production of coating agents or lacquers from the binding agent dispersions prepared according to the invention it is possible to disperse into them pigments, fillers, corrosion inhibitors and/or conventional lacquer adjuvants in the conventional manner, at a suitable point in the manufacturing process.

The solid content of the coating agent according to the invention amounts best to 5 to 60 wt. % after dilution with water. When the lacquer is adjusted to a higher solid content of 25 to 50 wt. %, preferably 30 to 45 wt. %, water-thinning bake-on lacquers are obtained, which can be applied by dipping, spraying, rolling, etc., to the object to be lacquered. If, however, it is thinned to a solid content of 5 to 30 wt. %, preferably 10 to 20 wt. %, the lacquer is suitable for electrophoretic depositing. The bath is constantly stirred in order to maintain a uniform temperature on the cathode surface and prevent the settling of the insoluble component of the dispersion, e.g., of the pigments. The pH of the lacquer is generally between 4.0 and 8.0, preferably between 6.0 and 7.5. If the pH is too low, the acid must be expected to attack the iron of sinks, pipes and pumps. The electrophoretic depositing is best performed no sooner than 24 hours after preparation of the bath. During this time the bath should be continuously stirred to obtain a uniform distribution. The anodes are electrically conductive, noncorroding electrodes, e.g., of stainless steel or graphite. The object to be coated at the cathode, and the anode, are immersed in an aqueous bath, as is known in connection with electrophoretic coating. Any metallically conductive workpieces can be coated, such as copper, aluminum, tin, zinc, iron and alloys of these metals. During the coating the bath is kept at temperatures of preferably about 15° to 35° C. The solids, the depositing temperature and the time as well as voltage are selected such that the desired coating thickness is obtained after rinsing with ultrafiltrate and/or water and baking at temperatures of 130° to 230° C. Thus, the coating thicknesses increases with increasing coating time and depositing voltage. When an electrical current with a voltage of preferably 50 to 500 volts is applied between the metallically conductive workpiece and a counter-electrode, the water-thinning base resin coagulates on the cathode. It transports with it the water-insoluble crosslinking agent, pigments, catalysts etc. The ratio of pigment to synthetic resin binding agent in the deposited film can shift in favor of the pigment. At the safe time water and the acid used for neutralization become concentrated in the bath. Therefore concentrated lacquers must be used for make-up which equalize this shift by modified quantity ratios. This correction can also be performed by suitable apparatus set-ups, e.g., electrodialysis processes or ultrafiltration.

According to the invention it is also possible to prepare a concentrated binding agent which can be diluted with water, with, for example, a solid content of about 85 to 60 wt. %, and it can be pigmented in a conventional manner with ball mills, 3-roller mills, or pearl mills. Conventional pigments can be used, such as those described, for example, in DIN 55 944, as well as fillers, corrosion inhibitors and lacquer adjuvants such as anti-cratering agents, leveling agents or antifrothing agents. Naturally, those are selected which do not enter any undesirable reactions with water in the acid to neutral medium, do not bring in any water-soluble foreign ions and upon aging do not settle out in such a form that they cannot be stirred up again. The lacquers are especially suitable for electroimmersion lacquering of metals and, after being baked on for preferably 15 to 45 minutes at 140° to 180° C. they provide smooth ground coats with improved inter-coat adhesion, elasticity and stone impact strength. The pigment-to-binding agent ratio depends on the dispersibility and viscosity of the binding agent and is generally between 0.1:1 and 1.5:1.

The various additives, like the above-mentioned pigments etc., can be dispersed in the coating agent according to the invention in various ways. For example, the following possibilities exist:

a) Preparation of the aqueous dispersion of component A before adding component B, B being used for preparing the pigment paste and then being mixed with A.

b) Preparation of an aqueous dispersion of a portion of component A after the addition of component B. Dispersion of the additives into the remainder of the solution of component A and combining the dispersion of component A, the rest of the solution of component A, and the solution of B. In this case the solution of component B can also, before preparation of the withdrawn dispersion of component A, be combined with the latter and made together into a dispersion.

c) Working up of components A and B separately or together to a dispersion, preparation of a pigment paste with the other additives (e.g., with the above-defined hydroxyfunctional resins) and mixing of the components.

d) Addition of the pigments before preparation of the dispersion to A or to A+B, followed by preparation of the dispersion in the presence of the pigments or additives.

Preparation of modified epoxy resin/polyamine adduct A-I

In a reaction flask with stirrer, dropping funnel and reflux condenser, 582 g of xylene, 1,504 g of an epoxy resin on the basis of bisphenol A having an epoxide resin equivalent weight of 188 and 824 g of n-octylphenol are heated under inert gas at 100° C. After the addition of 0.8 g of a 50% aqueous solution of tetrabutylammonium chloride, the mixture is heated at 150° C. and held at this temperature until the epoxide equivalent weight amounts to 640. Then the mixture is cooled to 50° C. and a mixture of 720 g of xylene and 720 g of ethylenediamine is added, while the temperature of the exothermic reaction rises to about 105° C. The mixture is held for 3 hours at this temperature, a vacuum is applied, and the excess ethylenediamine is distilled off. The amine residues were distilled off with steam until an amine number of only less than 0.3 was passing over with the distillate.

Solid content: 93.5 wt. % after 30 min. heating at 180° C.)
Amine number: 177 (mg KOH per g of solid resin)
Viscosity: 149 mPa.s (after dilution to 50 wt. % with diethyleneglycol dimethylether at 25° C.).

Preparation of the aminoepoxide resin A containing urea groups 1000 grams of adduct A-I with a solid content of 93.5% were heated with 580 g of methylisobutyketone until water came out of the circuit with the solvent. After separation of 26 g of water the mixture was cooled to 40° to 45° C. and a solution of 244 g of hexanediisocyanate in 488 g of dry methylisobutylketone was added slowly, drop by drop, over 2 hours. Then the mixture is heated at 80° C. and held at this temperature until the NCO content amounts to 0%. The solvent was distilled out in vacuo and diluted with 150 g of ethoxy propanol.

Solids: 84.7 wt. % (after 30 min heating at 150° C.)
Amine number: 68
Viscosity: 590 mPa.s (after dilution with ethoxypropanol to 50 wt. % at 25° C.)

Crosslinking Agent (blocked polyisocyanate B)

666 g of isophoronediisocyanate and 134 g of trimethylolpropane are mixed with 431 g of dry ethylglycol acetate and heated with stirring and with the complete exclusion of atmospheric humidity to 60° C. within 1 hour. The initially insoluble and solid trimethylolpropane melts and reacts slowly within another hour, the temperature being raised to 90° C. To complete the reaction the mixture is held for another 3 hours at 90° C. The NCO equivalent weight is 410. Then 366 [grams] of epsilon-caprolactam are added over a period of 3 hours so slowly that the reaction temperature of 100° C. is not exceeded. The mixture is held at this temperature until the NCO number has fallen below 0.1%. The solvent is carefully removed by vacuum distillation and [the mixture] is diluted with butoxyethanol and sec. butanol in a weight-ratio of 2:5 to a solid content of 65 wt. %.

Polyacrylate resin containing hydroxyl groups (as additive)

In a reaction flask with stirrer, dropping funnel and reflux condenser, 370 g of butoxyethanol is heated at 130° C. under inert gas and over a period of 4 hours a mixture of 368 g hydroxyethylacrylate
736 g butylacrylate and
9 g tert.butylperoctoate is added uniformly at this temperature. Then hold at 130° C. for 1 hour and then cool down to 110° C. Reinitiation is performed twice with 3 g of tert.butylperoctoate at 2-hour intervals and thereafter the mixture is held for 4 hours at 130° C.

Solids: 74.2 wt. % (30 min 180° C.)
Viscosity: 2.4 Pa.s (at [above] solid [content])
Hydroxyl number: approx. 160 (mg KOH per g of solid resin)

EXAMPLE 1

194.8 g of aminoepoxide resin A containing urea groups is mixed with 184.6 g of blocked polyisocyanate B and 20.2 g of the above-obtained polyacrylate resin containing hydroxyl groups. After addition of 4.5 g of formic acid (85%) the mixture is thinned with fully desalted water to 2 liters. Bath values:

Solids: approx. 15 wt. %
MEQ$_S$ value: 39.5 (milliequivalents per 100 g resin)
pH: 7.0
Bath conductivity: 1.096 uScm$^{-1}$ Zinc phosphate treated steel plates are coated at 25° C. for 2 minutes at 280 volts and, after rinsing off with water, the film is baked on at 180° C. A coating thickness of 18 to 20 microns is measured. The properties of the film are:

| | |
|---|---|
| Koenig pendulum hardness (DIN 53 157) | 210" |
| Erichsen cupping (DIN 53 156) | 6.5 mm |
| Grid slash (DIN 53 151) | 0 to 1 |
| Salt spray test (DIN 50 021) | 480 hours |
| Underseepage at the cut | 0.3 mm |
| Surface rust | 0 |
| Bubbles | $m_o/g_o$ (amount and size both zero) |

The bath remaining after the lacquering has no resin content to interfere with continuous operation by concentrating.

We claim:

1. An aqueous coating material which contains an organic synthetic resin binding agent and which can be diluted with water after protonization with acids, comprising a synthetic resin component and a crosslinking agent, wherein the organic synthetic resin binding agent comprises (i) from about 40 to about 95% by weight of an amino epoxide synthetic resin containing at least one primary amino moiety and at least one urea moiety per molecule, said amino epoxide resin being the product of (a) the defunctionalization of a polyepoxide resin by reaction with monofunctional alkyl or alkylaryl compounds of the formula R—X—H, in which X is —O—, —S—, —NR—, —CONH—, or —COO—, and R is a linear, branched, cyclic, saturated or unsaturated $C_{2-20}$ alkyl moiety which optionally contains ether bonds in the chain or in the ring, and/or is substituted by hydroxyl groups and/or $C_{1-4}$ alkoxy moieties, or said R is an aryl moiety which is substituted by from one to three of said $C_{2-20}$ alkyl moiety in an amount whereby 0.5 to 1.2 epoxide groups per molecule remain free;

(b) followed by a reaction with excess polyamine containing no other functional groups than optional secondary amino groups which are reactive with epoxy group;

(c) then a reaction of from about 40% to about 90% by weight of the modified epoxy resin/polyamine adduct obtained in step (b), with an aldehyde or ketone in such an amount that the ratio of primary amino groups to aldehydes or ketones if from about 1:1.1 to about 1:5, to form an imine, (d) then a reaction of said imine with from about 10 to about 60% by weight of polyisocyanates, wherein the weight percentages of said imine and of the polyisocyanates add up to 100%; and (e) then hydrolysis of the aldimine or ketimine groups of the imine by additional water;

(ii) said synthetic resin having at least one primary amino and one secondary amino group and from about two to about six hydroxyl groups in the molecule;

(iii) said crosslinking agent is from about 5% to about 60% by weight of a compound reactive with amino and/or hydroxyl groups.

2. The aqueous coating material of claim 1, wherein prior to defunctionalization the polyepoxide resin has from 1.5 to 8 epoxide groups per molecule and an epoxide equivalent weight of from about 70 to about 500.

3. The aqueous coating material of claim 2, wherein the polyamine has a molecular weight of from about 60 to about 300.

4. The aqueous coating material of claim 1, further containing at least one of a crosslinking catalyst, pigment, filler, corrosion inhibitor, lacquer adjuvant, and organic solvent in an amount up to 10 weight % with respect to the total weight of the coating material.

5. A method for the preparation of the aqueous coating material of claim 1, comprising the steps of (a) reacting from about 40% to about 90% by wt. of the modified epoxide resin/polyamine adduct with an aldehyde or ketone wherein the water formed during the reaction is removed azeotropically by distillation, to provide a first reaction solution of an imine; (b) reacting with the first reaction solution from about 10 to about 60% by wt. of a polyisocyanate, the percentages by weight of the imine and of the polyisocyante adding up to 100%, to provide a second reaction solution; (c) treating the second reaction solution with a solution of an amine and/or hydroxyl group-reactive crosslinking agent; (d) partially or completely neutralizing the second reaction solution with an acid either before or after the treatment with the crosslinking agent; (e) adding water to the treated solution; and (f) azeotropically distilling the solvents contained in the treated solution.

6. The method of claim 13, wherein at least one of crosslinking catalysts, pigments, fillers, corrosion inhibitors, lacquer adjuvants, and solvents are added in the process either during the reaction or after the completion thereof.

7. The aqueous coating agent of claim 1 wherein in the polyisocyanate is a diisocyanate and is reacted with the imine component in a molar ratio of x mol diisocyanate to (x+1) mol imine component, where X is from 1 to 6.

8. The aqueous coating agent of claim 1 wherein the crosslinking agent is one or more blocked polyisocyanates with an average of more than two blocked isocyanate groups per molecule.

9. The aqueous coating agent of claim 1, wherein the epoxy resin is a liquid reaction product of bisphenol A with epichlorhydrin, with an epoxide equivalent weight of 170 to 300.

* * * * *